United States Patent

Van Unen

[11] Patent Number: 6,143,186
[45] Date of Patent: Nov. 7, 2000

[54] DEVICE FOR CONTINUOUS FILTRATION OF LIQUIDS

[76] Inventor: Sabine Van Unen, Taubenstrasse 3, D-45968 Gladbeck, Germany

[21] Appl. No.: 09/242,378
[22] PCT Filed: Aug. 11, 1997
[86] PCT No.: PCT/DE97/01760
§ 371 Date: Jul. 23, 1999
§ 102(e) Date: Jul. 23, 1999
[87] PCT Pub. No.: WO98/06473
PCT Pub. Date: Feb. 19, 1998

[51] Int. Cl.[7] .......................... B01D 24/28; B01D 24/46; C02F 1/00
[52] U.S. Cl. .......................... 210/786; 210/794; 210/795; 210/807; 210/169; 210/170; 210/189; 210/216; 210/220; 210/268; 210/270; 210/275; 210/279; 210/290
[58] Field of Search .................. 210/765, 786, 210/780, 792, 793, 794, 795, 797, 798, 197, 772, 747, 807, 169, 170, 189, 216, 220, 268, 270, 275, 279, 290

[56] References Cited

U.S. PATENT DOCUMENTS

| | | | |
|---|---|---|---|
| 3,667,604 | 6/1972 | Lagoutte | 210/136 |
| 4,060,484 | 11/1977 | Austin et al. | 210/268 |
| 4,126,546 | 11/1978 | Hjelmner et al. | 210/786 |
| 4,246,102 | 1/1981 | Hjelmner et al. | 210/786 |
| 4,720,347 | 1/1988 | Berne | 210/795 |
| 5,252,230 | 10/1993 | Dunkers | 210/792 |
| 5,454,959 | 10/1995 | Stevens | 210/792 |
| 5,462,654 | 10/1995 | Hering, Jr. | 210/268 |
| 5,472,610 | 12/1995 | Jönsson | 210/794 |
| 5,520,804 | 5/1996 | Ward | 210/274 |
| 5,543,037 | 8/1996 | Hering, Jr. | 210/268 |
| 5,582,722 | 12/1996 | Wachinski et al. | 210/268 |
| 5,681,472 | 10/1997 | Jönsson et al. | 210/268 |

FOREIGN PATENT DOCUMENTS

| | | |
|---|---|---|
| 0 291 538 | 11/1988 | European Pat. Off. . |
| 24 34 968 | 3/1975 | Germany . |

*Primary Examiner*—Robert J. Popovics
*Attorney, Agent, or Firm*—Robert W. Becker & Associates

[57] ABSTRACT

A continuous filter device for liquids has a filter chamber that receives a granular bulk material forming a filter bed. The filter chamber has rectangular inner-walls with a liquid-permeable inlet side and a liquid-permeable outlet side positioned opposite the inlet side. A liquid-impermeable outer wall is positioned at the inlet side and forms together with the inlet side an inlet chamber. The inlet side has openings allowing flow of a liquid to be filtered from the inlet chamber into the filter chamber. A liquid-impermeable outer mantle is positioned at the outlet side and forms together with the outlet side a filtrate collection chamber. The outlet side has openings allowing filtrate flow from the filter chamber into the filtrate collection chamber. A cone-shaped removal chamber is connected to a lower end of the filter chamber. A flow discharge chamber is connected to an upper end of the filter chamber. A bulk material separating apparatus is positioned in the flow discharge chamber for separating dirt particles from the bulk material. A lifting system has a removal tube with a lower suction end projecting into a bottom portion of the removal chamber and an upper end extending into the bulk material separating apparatus. Flow discharge devices are connected to the bulk material separating apparatus. The bulk material is removed by the removal tube from the removal chamber and guided into the bulk material separating apparatus from where it is flow discharged by the flow discharge devices onto the filter bed to form a bulk material heap that is non-uniform and arranged close to the outlet side.

9 Claims, 1 Drawing Sheet

DEVICE FOR CONTINUOUS FILTRATION OF LIQUIDS

BACKGROUND OF THE INVENTION

The invention relates to a device for continuously filtering liquids, comprising an upright container portion that, in cross-section, is rectangular and has an inner wall rectangular in cross-section, whereby the filter chamber receives granular bulk material as a filter bed, and further relates to a method for continuously filtering liquids, especially for treating waste water with high solid and suspended material component such as industrial waste water, for treatment of water for industrial use taken from ground water and surface water, recirculating water, cooling water, and also swimming pool water as well as treatment of potable water.

In the prior art continuous sand filters are known which, for example, provide a radial filtration of the raw water through the filter bed. The raw water is then guided into a centrally arranged distribution chamber, flows via lamellas into the filter layer, whereby the filter layer is subjected to flow from the interior to the exterior. The filtrate leaves the filter layer via special filter nozzles arranged in the outer container wall and is then collected in an exterior annular chamber as the filtrate.

EP-A 0 291 538 discloses a sieve fabric arranged at the inner wall of the cylindrical annular chamber having a mesh width of 10 to 200 micrometer as a micro filter. The heavy, flocculated dirt particles collected at the micro filter are guided downwardly and are introduced into a cone-shaped removal chamber into the flowing filter bed. The micro filter is thus continuously hydraulically cleaned from the interior hollow space by use of a mammoth pump which is operated by pulsating introduction of compressed air. However, it was shown that the device expenditure of the conventional sand filter due to the hydraulic cleaning system is very high, which system is comprised of equidistantly spaced tubes arranged axis-parallel to one another. At their upper end they are fastened to a rotatably support star. Each of the tubes furthermore comprises a number of outlet jets that are directed at a slight slant onto the mantle surface of the sieve fabric.

Furthermore, the conventional sand filter may be able to handle for short periods of time flocculation of the raw water, but for extended periods of flocculation the outlet jets of the hydraulic cleaning system will become clogged and, also, clogging of the openings of the sieve fabric in the interior hollow space of the annular cylindrical container portion can be observed. At the same time, it is also possible that flocculation of the raw water in the filter bed of the conventional sand filter will occur which also will result in clogging so that in the filter layer a pressure loss is to be observed and the risk of penetration during filtration is present resulting in dirt particles reaching the filtrate side. It is often observed that the flocculation of the raw water results in a clogging action especially in the area of the filter bed which is close to the hydraulic ring system.

The solid particles retained within the pores of the filter bed reduce, of course, the permeability of the filter layer so that for the same load amount the pressure loss in the filter layer of conventional sand filters will increase. However, these processes are limited because the pressure loss cannot be increased indefinitely and the permeability cannot be reduced indefinitely. When the pores will clog because of deposits, the free pore diameter also becomes so small that the deposited dirt particles are torn off by shearing forces and will be entrained by the outflowing filtrate to the filtrate side, a situation that must be prevented at all cost.

In order to avoid a clogging of the conventional sand filters, for example, according to EP-A 0 291 538, sedimentation stages are arranged upstream of the conventional sand filter in order to (have) a precleaning action and thus prevent the risk of flocculation of the raw water in the conventional sand filter. They require a further control and additional coordination of the filtration steps, an expenditure that is to be avoided.

It is an object of the present invention to eliminate the disadvantages of the prior art. Furthermore, it is desirable to provide a device for continuous filtration of liquids which is especially suitable for cleaning industrial waste water or raw sewage with high solid load of any kind. Solid load in the context of the invention refers to, in addition to solid materials, also large volume flocculates or flocculate-like particles which conventionally have the tendency to quickly clog the filter layer areas facing the inlet of waste water. Furthermore, it is desirable when the device expenditure of the apparatus for continuous filtration of liquids is maintained minimal in order to ensure a high operational safety without the use of complicated control devices of the filtration steps. Furthermore, it would be very advantageous to provide a device with sufficiently constant permanent filtration capability that is independent of the type and composition of the waste water to be filtered.

SUMMARY OF THE INVENTION

The object of the invention is a device for continuously filtering liquids which comprises a filtration container with an upright container portion having in cross-section a rectangular design, which comprises a filter chamber for receiving granular bulk material, whereby the inner walls, in cross-section rectangular, comprise an inlet side and an outlet side opposite the inlet side, a) the liquid-permeable inlet side is surrounded by a liquid-impermeable outer wall under formation of an inlet chamber and openings for introduction of the liquid to be filtered from the inlet chamber into the filter chamber are provided, b) the liquid-permeable outlet side comprises a liquid-impermeable outer mantle under formation of a filtrate collection chamber and openings are provided for guiding the filtrate out of the filter chamber into the filtrate collection chamber, c) to the lower end of the filter chamber a cone-shaped removal chamber with funnel wall is connected and the upper end of the filter chamber has connected thereto a flow discharge chamber for receiving a bulk material separation apparatus for separating dirt particles from the bulk material, d) the bulk material separation apparatus communicates with a removal tube of a lifting system which with its lower suction end projects into the lower portion of the removal chamber and wherein the removal tube projects into the upper end of the flow discharge chamber, and e) the bulk material separation apparatus is connected to a bulk material distributor which comprises one or more bulk material flow discharge devices for discharging onto the surface of the upper side of the filter bed in the filter chamber the bulk material separated by the bulk material separation device and for formation of at least one bulk material heap that is provided substantially with unequal sides and is arranged at the upper side of the filter bed and at the outlet side.

The invention relates also to an inventive device for continuously filtering liquids which comprises an upright container portion, substantially rectangular in cross-section, with a filter chamber for receiving granular bulk material, whereby the inner wall, which in cross-section is rectangular, has an inlet side and an outlet side opposite the inlet side, whereby a) the liquid-permeable inlet side is surrounded by a liquid-impermeable outer wall under formation of an inlet chamber and openings are provided for introduction of the liquid to be filtered from the inlet chamber into the filter chamber, b) the liquid-permeable outlet side comprises a liquid-impermeable outer mantle under formation of a filtrate collection chamber and openings are provided for removing the filtrate from the filter chamber into the filtrate collection chamber, c) a cone-shaped removal chamber with funnel wall is connected to the lower end of the filter chamber and the upper end of the filter chamber is connected to a flow discharge chamber for receiving a bulk material separation apparatus for separating dirt particles from the bulk material (25), d) the bulk material separation apparatus communicates with a removal tube of a lifting system which with its lower suction end projects into the lower section of the removal chamber and wherein the suction tube projects into the upper end of the flow discharge chamber, and e) the bulk material separation apparatus is connected to a bulk material distributor which is arranged above the upper side of the filter bed and substantially at the outlet side, whereby the bulk material distributor has one or more bulk material flow discharge devices, whereby the bulk material flow discharge devices have an outlet opening and/or a distribution plate for discharging onto the surface of the upper side of the filter bed positioned in the filter chamber the bulk material separated by the bulk material separation apparatus under formation of at least one bulk material heap that has unequal sides.

A further object of the invention is a method for continuously filtering liquids whereby a) a liquid to be filtered is introduced through one side, provided as the inlet side, of a rectangularly embodied container portion into its filter chamber, which contains granular bulk material as a filter, over the entire height of the filter chamber and over the entire width of the inlet side and the filtrate is removed at the outlet side, positioned opposite the inlet side over the entire height of the filter chamber and over the entire width of the outlet side, b) a filter chamber is used which has at its lower end a cone-shaped removal chamber and at its upper end a flow discharge chamber, c) the bulk material is moved in the filter chamber from the top to the bottom and transverse to the flow direction of the liquid to be filtered in the filter chamber, d) whereby the bulk material in the lower portion of the removal chamber is removed by a lifting system and supplied to the surface of the upper side of the filter bed by flow discharge onto the surface of the upper side of the filter bed under formation of at least one bulk material heap having unequal sides, whereby the bulk material is distributed with increasing granular size in the direction toward the inlet side.

The invention also concerns a method for continuously filtering liquids, especially for cleaning waste water, which is characterized in that a) a liquid to be filtered is introduced through one side as the inlet side of a rectangularly embodied container portion into its filter chamber, containing granular bulk material as a filter, for example, sand, over the entire height of the filter chamber and the entire width of the inlet side and the filtrate is removed through the outlet side, opposite the inlet side over the entire height of the filter chamber and the entire width of the outlet side, b) the filter chamber at its lower end has a cone-shaped removal chamber and at its upper end has a transition into a flow discharge chamber, c) the bulk material is moved in the filter chamber downwardly and transversely to the flow direction of the liquid to be filtered in the filter chamber, and d) the bulk material in the lower portion of the removal chamber is removed by a lifting system and supplied to the surface of the upper side of the filter bed by flow discharge onto the surface of the upper side of the filter bed under formation of at least one bulk material heap having unequal sides, whereby the bulk material is distributed substantially with increasing granular size, respectively, granular diameter in the direction toward the inlet side.

A further object of the invention is the use of the inventive device directed to treatment of waste water, preferably industrial waste water, for treatment of water for industrial use taken from ground water and surface water, of circulating water, cooling water, and water in swimming pools, other process liquids, such as saline solutions, sulphuric acid etc., as well as for treatment of potable water.

With the inventive method the liquid to be filtered, for example, industrial waste water, ground water, surface water, circulating water, cooling water, and swimming pool water, is introduced through one side embodied as the inlet side of an upright container portion, rectangular in cross-section, rectangular of a filtration container into its filter chamber. The filter chamber contains a granular bulk material, for example, fine granular materials such as at least one material from the group comprising sand, coal, hard coal, lava, pumice, glass, plastic, clay, and cellulose materials etc., preferably in granular form. The liquid to be filtered is introduced preferably over the entire height of the filter chamber and over the entire width of the inlet side into the filter chamber and/or removed preferably over the entire height of the filter chamber and over the entire width of the outlet side from the filter chamber.

In the context of the invention the filter chamber is the chamber of the container which contains the filter bed with granular bulk material and through which the liquid to be filtered, such as waste water, preferably industrial waste water, water for industrial use taken from ground water and surface water, circulating water, cooling water, swimming pool water is guided, from the inlet side to the outlet side. Filtration is to be understood also as a cleaning process.

The liquid to be filtered, such as household waste water or industrial waste water with high solid and/or flocculate contents, flows from the inlet side to the outlet side positioned opposite the inlet side of the container portion. Continuous filtration in the context of the invention is to be understood such that at least a portion of the bulk material during supply of the liquid to be filtered is also permanently regenerated, i.e., dirt particles are removed therefrom, and returned to the filtration process. Dirt particles include solid particles, suspended particles, and particles that flocculate during filtration.

The filtrated liquid, i.e., the filtrate is guided through the outlet side into the filtrate collection chamber and is removed to the exterior via a socket or drain positioned preferably at the upper end of the filtrate chamber. The socket or drain can also be arranged at any other location of the exterior mantle. The filtrate flows preferably through the outlet side over the entire height of the filter chamber and over the entire width of the outlet side. The flow path of the inlet side and the outlet side over the entire height of the filter chamber and its respective width by means of a plurality of openings or penetrations ensures that the filter bed is substantially subjected to a uniform flow of the liquid to be filtered over the entire surface. The uniform flow path, covering the entire cross-sectional surface area of the filter bed, ensures also that in the inventive device by employing the inventive method substantially a homogenous filtration surface without filtration dead space in the flow direction as well as a uniform distribution of the dirt particles and suspended particles to be removed is provided, so that the inventive method is characterized also by higher and constant throughput efficiency and reduced filtration resistance in comparison to the prior art, especially since localized clogging is prevented. There are also no irregularities in the throughflow of the filter bed because preferably the size of the surface area of the outlet side corresponds to the size of the surface area of the inlet side.

The granular bulk material of the filter bed is moved continuously transverse to the direction of flow of the liquid to be filtered from the top to the bottom within the filtration container. The substantially rectangular (in cross-section) container portion of the filtration container may comprise the filter chamber and the flow discharge chamber. The filter chamber and the flow discharge chamber can be cube-shaped, especially parallelepipedal, whereby the lower end of the filtration container is advantageously cone-shaped. However, the funnel-shape of the removal chamber is not limited to a particular embodiment. The removal chamber can also be of an octagon funnel-shape. The cone-shaped or funnel-shaped embodiment of the funnel wall of the container surrounds the removal chamber. The removal chamber is filled with bulk material whereby in the lower portion of the removal chamber the bulk material is sucked in by a conventional lifting system uniformly or pulsatingly by the suction force provided by the lifting device during operation. The bulk material that is sucked in is then transported with the aid of the lifting system together with air and/or washing medium, for example, water, liquid to be filtered, and/or filtrate, to a bulk material separation apparatus which is positioned at the upper end of the container. In a preferred inventive embodiment the lifting system is operated with air. The washing medium can be gas such as air. The upper end of the filtration container is referred to as flow discharge chamber. The flow discharge chamber, for example, can be of a cube-shape or of a parallelepipedal shape. The filter chamber can also be embodied as a cube shape or a parallelepiped. The container portion may comprise the flow discharge chamber and the filter chamber, for example when it is rectangular in cross-section and, for example, has a cube shape, preferably a parallelepipedal shape. In the bulk material separating apparatus, the regeneration and separation of the bulk material from dirt particles takes place.

As the bulk material separating apparatus it is, for example, known to employ an up-current classifier into which the lifting system will transport. The principle of such an up-current classifier is based on the different sedimentation velocities of the differently sized dirt particles. This means that the deposition velocity of the bulk material, for example, that of the sand granules, is greater than that of the dirt particles. Counter to the sedimentation direction of the sand granules, i.e., vertically upwardly, the washing medium, for example, water, will flow constantly. The flow speed of this volume stream is smaller than the sedimentation velocity of the sand granules but multiple times greater than that of the dirt particles. Furthermore, the dirt particles are entrained by the upwardly flowing volume flow and are thus separated with the dirt/ washing medium. This dirt washing medium is comprised substantially of the washing medium such as water, filtrate, and/or liquid to be filtered and the dirt particles. The sand granules that have been cleaned from the dirt particles will precipitate or slowly flow onto the filter bed.

A bulk material distributor may be coupled to the bulk material separating apparatus. The bulk material distributor can have one or more bulk material flow discharge devices and optionally conveying lines via which the bulk material is guided from the bulk material separating apparatus to one or more bulk material flow discharge devices. The bulk material flow discharge can have an outlet opening and/or a distribution plate. With the aid of the bulk material distributor, the discharge of the cleaned bulk material onto the surface of the upper side of the filter bed can be performed.

By a certain arrangement of the distributor sheet metal or the outlet openings of the bulk material distributor the degree of unequal shaping of the bulk material heap can be determined. For example, the unequal shaping of the bulk material heap can be varied by position changes of the distributing plates coupled to the outlet openings, i.e., by changing the spacing of the distributor plates from the outlet side via which the bulk material will flow onto the upper side of the filter bed. The degree of unequal shaping of the bulk material heap can also be controlled by the amount of spacing of the outlet openings of the bulk material distributor from the outlet side, in the case when no distributor plates are provided. Depending on the specifications with regard to the filtering capability of the inventive device, the bulk material distributors can be moved with its outlet openings and/or the distributor plates in the direction toward the inlet side or outlet side, i.e., in an area between the outlet side and the central longitudinal axis of the container portion, the filter chamber and/or the flow discharge chamber, with the condition that an unequal bulk material heap is formed on the upper side of the filter bed, respectively, the surface of the upper side of the filter bed, whereby it is made possible that the bulk material with greater granular diameter is arranged substantially at the inlet side and the bulk material with smaller granular diameter is arranged at the outlet side. The heap slant facing the inlet side is longer than the heap slant of the bulk material heap facing the outlet side. The central longitudinal axis of the container portion, respectively, of the filter chamber can have the same spacing from the inlet side and the outlet side.

The bulk material distributor can have a plurality of bulk material devices, i.e., outlet openings for the bulk material that has been cleaned. It is also possible to couple distributor plate to the outlet openings via which the bulk material is discharged onto the surface of the filter bed and, for example, the spacing of the tips of the bulk material heap from the outlet side can be controlled.

Since the bulk material distributor or the bulk material flow discharge device, for example, the outlet openings of the bulk material separating apparatus, are positioned in the inventive device in an area facing the outlet side above the surface of the filter bed, the bulk material will flow under formation of a bulk material heap onto the surface of the upper side of the filter bed. The upper side of the filter bed is the side of the filter bed facing away from the removal chamber. The bulk material heap has an unequal shape. The bulk material heap is thus not centered relative to the filter bed but is closer to the area facing the outlet side. Especially, the tip of the bulk material heap is arranged in the area between the outlet side and the central longitudinal axis of the container portion, the filter chamber and/or the flow discharge chamber. For example, one or more outlet openings may be provided which are preferably arranged in a row parallel to the outlet side. The outlet openings can be oval, round, square, and/or elongate. Elongate outlet openings extend parallel to the outlet side of the container preferably over the entire width of the outlet side and produce an unequal bulk material heap on the surface of the upper side of the filter, whereby its tip in a plan view onto the inventive device is substantially parallel to the outlet side of the filtration container. This means that the tip of the bulk material heap in a plan view is substantially transverse to the flow direction of the liquid to be filtered within the filter bed. In the case of arranging a plurality of round outlet openings in a row parallel to the outlet side, a substantially unequal bulk material heap will be generated whereby the tip of the bulk material heap, in the form of a crest of the bulk material heap, extends parallel to the outlet side in a plan view.

By arranging, for example, elongate outlet openings of the bulk material distributor, the particles of the bulk material with greater granular diameter will move substantially on the surface of the filter bed in the direction toward the inlet side of the filtration container, while the particles with a smaller granular size move substantially on the filter bed to a lesser degree in the direction toward the inlet side and remain substantially in the area of the tip of the bulk material heap. This means that in the case of employing, for example, granular sand, the larger granules will substantially roll in the direction toward the inlet side and the smaller ones will remain substantially in the area of the tip of the bulk material heap. This achieves a permanent deposition of the sand during operation of the inventive method in the inventive device with different granular diameter, for example, sand grain diameter, whereby the grain diameter from the inlet side in a direction toward the bulk material heap tip is substantially decreasing. The modifier substantially in this context is used because the sand grains will roll in the direction toward the inlet side depending on their grain diameter and it cannot be excluded that possibly a minimal portion with larger grain diameter will remain in the vicinity of the bulk material heap tip. However, it was found that this portion can be neglected, and the excellent results of the invention are not impaired. The arrangement of the bulk material distributor with its outlet openings and optionally with distributor plates at the outlet side or in the vicinity of the outlet side means also that essentially the unequal bulk material heap will form the upper side of the filter bed, the bulk material heap tip in the area between the central longitudinal axis of the container portion of the filter chamber and/or of the flow discharge chamber, whereby it is made possible that the bulk material with greater grain diameter is substantially arranged at the inlet side and the bulk material with reduced grain diameter is arranged at the outlet side. The slanted heap side of the unequal bulk material heap facing the inlet side is longer than the heap side facing the outlet side. The slanted heap side facing the inlet side can extend up to the inlet side, respectively, to the outlet side. The bulk material flow discharge device as well as the outlet openings or the distributor plates are spaced from the surface of the upper side of the filter bed. The spacing of the outlet opening from the surface of the upper side of the filter bed and/or the spacing of the outlet opening or the distributor plate to the inlet side can be selected easily because the spacing depends only on the few physical parameters such as width between inlet and outlet sides and desired grain diameter at the inlet side and can be adjusted depending on the specifications of the filtration. For example, the spacing between the plumb line of the outlet opening and the inlet side can be preferably a multiple of the spacing between the plumb line and the outlet side so that a unequal bulk material heap will result upon discharge onto the surface of the upper side of the filter bed. The plumb line of the outlet opening in the context of the invention is a straight line which extends parallel to the flow discharge of the bulk material and which intercepts the center point of the outlet opening which is, for example, circular. The inventive device and method employing the inventive device solve the objects to combine especially the advantages of the conventional multi layer filtrations, such as combining and pre and after cleaning stages, with the advantages of a continuously operating, conventional filtration method, for example, the permanent removal of spent bulk material, the supply of regenerated bulk material together with continuous operation of cleaning of the liquid to be filtered. Furthermore, the present invention provides a minimal apparatus expenditure for manufacture, assembly as well as operation of the inventive device and provides increased operational safety while lowering operational costs. The inventive device is, in principle, based on the continuous horizontal flow-through of the filter bed in combination with a vertical filter bed movement during filtration. It has been shown that the embodiment of an unequal bulk material heap at the outlet side of the filtrate in the filter chamber will move the bulk material having a greater grain diameter in the direction of the inlet side of the filtration container while portions of the bulk material with smaller grain diameter will remain at the outlet side so that the grain diameter decreases from the inlet side in a direction toward the outlet side. At the inlet side coarse or large size dirt particles are removed while smaller size particles will be removed at the area of the bulk material facing the outlet side. A clogging of the bulk material, as has been observed in conventional continuously operating sand filters is, eliminated satisfactorily due to the large grain size of the bulk material at the inlet side. Accordingly, the positioning of a sedimentation device upstream, commonly referred to a presedimentation stage, for removal of coarse and large size dirt particles from the liquid to be filtered, which is a requirement for continuously operating sand filters, is no longer needed. Accordingly, the filtration of liquids that are highly loaded with solid particles or suspended particles is possible with the inventive device without the conventionally observed sudden pressure losses within the filter bed. Especially in the case of conventional sand filters, the disadvantage is apparent that the pressure loss cannot be increased as desired and the permeability cannot be reduced indefinitely so that, when the pores are clogged by deposits of solid particles, the pore diameter is so small that the deposited solid particles are entrained by shearing forces and also entrained with the outflowing filtrate to the filtrate side so that the opposite is achieved that was to be effected with the conventional sand filter, i.e., penetration of the solid particles to be removed to the filtrate side is the consequence.

Furthermore, the removal of the bulk material loaded with suspended particles can be performed continuously at the lower area of the filtration chamber and cleaning of the bulk material by the bulk material separating apparatus as well as refilling of the filter bed with cleaned bulk material at the upper area of the filtration chamber by means of the bulk material distributor can be performed so that the liquid to be filtered is exposed continuously to a sufficiently clean bulk material for cleaning purposes.

Furthermore, the inventive device is characterized in that, because presedimentation stages are eliminated and no discontinuously operating method steps are necessary for cleaning the bulk material and the liquid to be filtered, the apparatus expenditure is minimal because control devices for adjusting the method steps relative to one another and for controlling them a discontinuously operating method, are eliminated and, furthermore, control devices are no longer required which would have to measure clogging of the filter material for a continuously operating conventional filter, such as a sand filter, and interrupt cleaning of the filtrate.

This means that, in addition, due to the elimination of requirements of back flow of the filter material and the thus resulting operational down times, in contrast to conventional methods and devices the inventive method has a very high operational safety and the operational costs are minimal due to the continuous operation of the method. Also, because fewer pumps, control systems, control sensors, pipe lines, etc. are needed, a reduction of the expenditure with regard to components of the inventive device and during operation of the inventive method is realized.

Also, it has been shown that the inventive device can be used for highly loaded industrial waste water that is greatly loaded with solid particles or suspended particles as well as for water for industrial use, cooling water, circulating water, and swimming pool water which are, as is known, less loaded with solid particles or suspended particles without adaptation of the inventive device to the different compositions of the liquids to be filtered, in contrast to conventional devices where switching on or switching off of presedimentation stages is required so that for this reason the apparatus expenditure is also surprisingly small and the operational costs and monitoring costs of the inventive device are also reduced because of the high operational safety.

The object of the device and method according to EP-02 91 538 is to provide a uniform flowing of granular filter particles of bulk material whereby no irregularities in the flow movement result and undesirable bridge formation, which would cause a reduction of the filter efficiency of the bulk material, and the penetration of the dirt particles (see supra), is to be avoided. The apparatus expenditure with respect to known methods should be reduced in order to provide an operationally safe system and to increase the filter action and the filter efficiency.

The conventional device comprises an annular cylindrical upright container portion for receiving the granular filter particles, whereby the outer and inner walls are liquid-permeable, which container portion is surrounded externally by a mantle that is closed off at both ends and has at its lower end of the annular cylindrical container portion a removal chamber that is comprised of two funnel walls. The lower suction end of a known mammoth pump projects into the lower portion of the cone-shaped removal chamber. In the removal chamber an annular nozzle system is provided at the outer funnel wall. It has a circumferential channel into which the socket for supply of water opens and further comprises a hydraulic cleaning system in the interior of the annular cylindrical container portion. The cleaning system comprises three axis-parallel tubes positioned equidistant to one another. Their upper ends are fastened to a rotatably supported star. Each one of these tubes extends at a small parallel spacing to a sieve fabric and has a plurality of outlet nozzles. At the inner liquid-permeable wall of the inner chamber a sieve fabric is provided.

The plurality of different components and mechanically movable devices as well as the hydraulic cleaning system and its construction already indicates that the object based on the conventional teaching cannot be fulfilled with respect to reducing the apparatus expenditure as well as to increasing the operational safety. Furthermore, during operation of the conventional device it was found that the bulk material with greater grain diameter is positioned at the outlet side, i.e. the exterior and that the bulk material with reduced grain diameter will collect at the inlet side, that is, at the interior, so that, of course, the risk of clogging of the filter bed at the inlet side, resulting from large size dirt particles of the liquid to be filtered, is present. Thus is a risk factor that is to be avoided especially for continuous filtration and, based on which, the use of the conventional device with respect to liquids to be filtered having a substantially reduced portion of large size dirt particles is thus greatly limited in comparison to the inventive device and method.

When operating the device, the supply of the liquid to be cleaned, for example, industrial waste water, is carried out by a tube extending into the interior chamber, whereby the liquid to be cleaned flows through the sieve fabric into the adjacently positioned annular cylindrical chamber which is filled with granular filter particles and from here into the outer annular chamber which collects the liquid that has been cleaned. The prior art teaches that heavy flocculated dirt particles will flow in the interior downwardly to the annular gap and then are conveyed together with the water, supplied via the connecting socket by the mammoth pump, in the direction to the regenerating device provided at the upper dome; however, it was found, as is expressly stated in the printed document in column 5, lines 17 through 21, that clogging of a sieve fabric will occur during operation of the device. The clogging of the sieve fabric is the result of the presence of the heavy and flocculated dirt particles. Accordingly, the prior art suggests that an additional hydraulic cleaning system is to be used for cleaning the sieve fabric in certain intervals.

This, however, means that a continuous operation of the conventional device is no longer possible because, when clogging of the sieve fabric as a function of the contents of the heavy and flocculated dirt particles contained in the industrial waste water will increase continuously, the sieve fabric is exclusively to be cleaned by the hydraulic ring system and the cleaning water supplied therewith. Accordingly, a continuous operation of the conventional device is not possible because the higher the degree of soiling and thus clogging of the sieve fabric, the greater the risk that the supply of liquid to be filtered must be interrupted or at least reduced and the supply of cleaning water via the hydraulic ring system must be increased.

Because of the aforementioned different design and the different filtration principle of the device according to EP-02 91 538, firstly the liquid flows through the filter from the interior to the exterior (instead of from one outer side to the opposite outer side as in the present invention) so that the filtration path is disadvantageously shorter. Secondly, the filter surface at the inlet side is smaller than at the outlet side (instead of filter surfaces at the inlet and outlet side being of identical size as in the inventive device) which enhances the clogging action to be avoided resulting from the larger dirt particles that have flocculated at the inlet side. Thirdly, the filtering velocity within the filter bed is reduced from the interior to the exterior instead of, as in the case of the inventive device, providing a substantially uniform filtering velocity within the filter bed, which reduction enhances the penetration of larger and flocculated dirt particles in the area of the inlet side.

In contrast to the printed document EP-02 91 538, the inventive device is not at risk for clogging because no sieve fabric is provided, and greater and flocculated dirt particles are retained and filtered out because of the presence of bulk material of a greater grain diameter at the inlet side so that the particles are prevented from flowing in the direction of the bulk material having a smaller grain diameter.

However, this means also that in contrast to the prior art a correlation between the inflow volume of the liquid to be cleaned and the degree of soiling and the size of the dirt particles, for example, large volume or large flocculated particle is not present because the advantages of the multi layer filtration are used such that the suspended particles of a large size and large flocculated type are retained already in the outer areas of the bulk material. This advantage alone shows in a sufficient manner already the quality of the inventive device.

Furthermore, the device of EP-02 91 538 also does not fulfill in an effective manner the object to reduce the apparatus expenditure in order to ensure an increased operational safety because of the presence of the hydraulic cleaning system, which is embodied as a rotatably supported star with three axis-parallel tubes spaced equidistantly from one another and arranged in the interior of the annular cylindrical container portion, requires monitoring as well as a sufficient control during operation of the annular cleaning system as well as control supply of cleaning water and, with an increased extent of clogging of the sieve fabric, requires reduction of supply of fluid to be filtered and an increased amount of cleaning water.

In contrast to this prior art, the inventive device and method provide a continuous operation of the device, respectively, use of the method without requiring backflow or cleaning steps and the thus required temporary shutdown which is cost intensive and must be avoided.

Due to the inventive method providing decreasing grain diameter of the filter sand in the flow direction, the greater portion of the dirt particles to be filtered is deposited directly at the inlet side so that flocculation of industrial waste water will not result in clogging within the area of the inlet of the industrial waste water to be filtered as is observed with conventional sand filters. A further advantage of the inventive method is that in contrast to conventional continuously operating sand filters the requirement of a sedimentation stage upstream thereof is eliminated. The arrangement of a sedimentation stage upstream is not necessarily required with the inventive method because the special arrangement of the bulk material with large grain diameter primarily especially in the area of the inflow of the waste water contaminated with dirt particles, such as suspended particles and/or solid particles, will not result in clogging over a large surface area or locally due to the large grain size of the filter bed.

The elimination of the sedimentation stage results in a further reduction of apparatus expenditure during manufacture as well as assembly of the inventive device as well as during operation of the inventive method. The inventive method for continuously filtering is characterized also in that the liquid to be filtered can be cleaned in one filtration step even though it contains a high amount of solid particles or suspended particles, without observing suddenly increasing pressure losses within the filter bed, as is conventionally observed in the prior art upon clogging especially when flocculation occurs.

Furthermore, the expenditure in regard to the inventive method due to the elimination of requirements of backflow and the resulting operational shutdowns results in an increased operational safety and lowering of operational costs in contrast to conventional multi layer filtration.

Additionally, the inventive method and the inventive device require fewer pumps, control systems, pipe lines etc. i.e., an expenditure that is much smaller than in the prior art.

The invention relates to a device for continuously filtering liquids which comprises an upright container portion that is in cross-section rectangular and has in cross-section a rectangular inner wall whereby its filter chamber contains granular bulk material as a filter or filter bed, has an inlet side and an outlet side opposite the inlet side, and is characterized in that a) the liquid-permeable inlet side is surrounded by a liquid-impermeable outer wall under formation of an inlet chamber which at its upper end has an inlet opening for introduction of the liquid to be filtered into the inlet chamber whereby the inlet side has openings for introduction of the liquid to be filtered from the inlet chamber into the filter chambers, b) the liquid-permeable outlet side is provided with a liquid-impermeable outer mantle under formation of a filtrate collection chamber which at its upper end is connected so as to remove the filtrate from the filtrate collection chamber and has openings for removing the filtrate from the filter chamber into the filtrate collection chamber, c) at the lower end of the filter chamber a funnel-shaped removal chamber with a funnel wall is provided and to the upper end of the filter chamber is connected a flow discharge chamber for receiving a bulk material separating apparatus for separating dirt particles from the bulk material, d) the bulk material separating apparatus is connected to a removal tube of a lifting system whereby it penetrates with its lower section end into the lower portion of the removal chamber and the removal tube extends to the upper end of the flow discharge chamber, and e) the bulk material separating apparatus has a removal device for removing the dirt particles and a washing medium and is connected to a bulk material distributor with a bulk material distributor with a bulk material flow discharge device for flow discharging the bulk material onto the surface of the upper side of the filter bed contained within the filter chamber, the bulk material separated in the bulk material separating apparatus, under formation of one or more non-uniform bulk material heaps whereby the bulk material flow discharge device is positioned above the surface of the upper side of the filter bed, respectively, the upper side of the filter bed and is close to the outlet side or in the vicinity of the outlet side and whereby the slanted heap side facing the inlet side is longer than the slanted heap side of the bulk material heap facing the outlet side. The term flow discharge in the context of the invention refers to the process of the regenerated bulk material exiting the bulk material flow discharge device until impinging on the surface of the filter bed, respectively, the surface of the upper side of the filter bed. In one embodiment, the inlet chamber at its upper end may have an inlet opening for introduction of the liquid to be filtered into the inlet chamber; however, the inlet opening, depending on the requirements, can be positioned at the exterior wall. Preferably, the inlet chamber can have at its upper end and/or at the outer wall an inlet opening for introduction of the liquid to be filtered into the inlet chamber.

The bulk material distributor can have one or more bulk material flow discharge devices. The bulk material flow discharge device can be embodied as an outlet opening or as a distributor plage for distributing flow onto the surface of the upper side of the filter bed. It is essential that at least the bulk material flow discharge device is positioned above the surface of the upper side of the filter bed so that the non-uniform bulk material heaps are formed. This means that in one embodiment the bulk material separating apparatus must not be arranged above the surface of the upper side of the filter bed, when the bulk material flow discharge device is above the surface of the upper side of the filter bed.

As a bulk material flow discharge device of the bulk material distributor one or more elongate openings are used which extend parallel to the outlet side and along the outlet side. By allowing flow onto the surface of the upper side of the filter bed, one or more non-uniform bulk material heaps are generated having a tip or tips that extend parallel to the outlet side. By providing a plurality of outlet openings, substantially one single material heap is formed because it can be observed that the many individual bulk material heaps underneath the outlet openings with their individual tips will form a single bulk material heap with only one elongate tip that extends in a plan view parallel to the outlet side, whereby this happens, for example, by minimal vibrations during the flow discharge step. The term tip is used in this context to describe the tips directly below the outlet openings which will meld into an elongate crest of the bulk material heap.

However, depending on the specifications of cleaning of the liquid to be filtered, it may be required to use only a few outlet openings or distributor plates, for example, two, so that during the flow discharge two large non-uniform bulk material heaps are generated which will not fuse with one another. In general, the design of the non-uniform bulk material heaps can be changed by arrangement of the bulk material flow discharge device, such as outlet opening or distributor plate, relative to one another, the design of the bulk material flow discharge device such as elongate or round, and/or the number of bulk material flow discharge devices.

Furthermore, it can be observed that the outlet openings of the bulk material distributor can be arranged such in the vicinity of the outlet side of the filter chamber that the classification of the bulk material resulting from heaping the bulk material onto a bulk material heap in the direction toward the inlet side of the filter chamber is not considerably impaired by the area between the tip of the bulk material heap and the outlet side. It can even be observed that the sand grains having a larger grain diameter in this area may under certain circumstances move in the direction toward the inlet side due to the constant flow discharge and due to the minimal vibrations of the surface of the filter bed.

In conventional multi layer filtration in which the filtration is carried in the outflow, the large grain material is positioned above the sand layer with fine grain material so that a great portion of the dirt particles to be filtered are already deposited at the large grain material and the fine sand layer positioned underneath the large grain layer is available only for filtration of finer dirt particles. This multi-layer filtration is suitable for cleaning of industrial waste water like the inventive device, but is disadvantageous because of discontinuous operation since after sufficient loading of the filter layer with large-grain material a time-consuming regeneration of the multi-layer filtration bed by backflow and the thus resulting interruption of the filtration are necessary. The apparatus for regeneration is considerable.

As a granular material it is possible to use those according to DIN 19623 whereby filter sand as well as filter gravel can be used satisfactorily.

The universal applicability of the inventive device is also apparent in that it can be operated with excess pressure or vacuum. The conventional continuous filtration methods can take advantage of the multi-layer filtration only in that instead of use of a sand layer with coarse granular material on the filter bed a continuous filtration with coarse grains as a prefiltration stage can be used. However, in contrast to the inventive method the expenditure with regard to apparatus and control devices for controlling the filtration by the prefiltration and after filtration stages is considerable.

The inventive device can eliminate these disadvantages because the prefiltration stage and the after filtration stage of industrial waste water can be combined in one single cleaning step. The inventive device is furthermore advantageous with respect to minimal requirements in regard to control of the filling of the filter chamber with granular bulk material because the arrangement, respectively, classification of the bulk material according to grain diameter takes place automatically by gravity by flow discharge onto the surface of the filter bed without requiring action from the exterior.

Accordingly, the inventive method and the inventive device combines for the first time in a beneficial manner the advantages of the multi-layer filtration, i.e., a combination of pre and after cleaning stages, with the advantages of continuous filtration methods, i.e., the permanent removal of spent bulk material and the supply of regenerated bulk material, in a manner that, to a person skilled in the art, exhibits unexpected balanced properties.

The inventive device for continuously filtering liquids comprises a lifting system, preferably a mammoth pump operated by air having a lower suction end arranged in the lower portion of the removal chamber. In a further embodiment the funnel wall adjacent to the removal chamber may be provided with inlet nozzles, injectors which will flush, for example, washing medium such as filtrate or water or solutions etc. into the removal chamber. The combined water flushing of the filter bed in the removal chamber produces a fluidized bed which prevents compaction of the bulk material or bridge formation thereof in the area of the removal chamber. Furthermore, especially air/water flushing in the lifting system provides an intensive friction and cleaning of the bulk material as well as savings in regard to cleaning water relative to the method which employs instead of air only water as a washing medium. This success is apparently on the fact that the upwardly oriented water flow speed within the filter bed is subjected locally to short-term accelerations and directional changes in the removal chamber which result from the sudden water displacement by the upwardly rising air bubbles.

The inlet chamber comprises an inlet opening that is preferably spaced from the area of the inlet side with openings, for example, at the upper end of the inlet chamber. The filter collecting chamber has an outlet that is preferably spaced from the area of the outlet side with openings, for example, at the upper end of the filtrate collection chamber. The filtrate collection chamber can be connected by its upper end and/or the outer mantle to an outlet for removing the filtrate collected in the filtrate collection chamber. The inlet chamber can be in liquid flow communication to the filter chamber by jets, louvers, lamellas, bar sieves and/or sieve-like arranged openings. It is also possible to connect the filtrate collection chamber with the filter chamber by nozzles, such as filter nozzles, louvers, lamellas, bar sieves, and/or sieve-like arranged openings for allowing passage of the filtrate.

The filtration container which is embodied as a square or a parallelepiped comprises the centrally arranged container portion with the filter chamber, the lower portion with the removal chamber and the upper container portion with the flow discharge chamber. With the conventional lifting system the bulk material that is mixed with air and a portion of the liquid to be filtered is conveyed by a removal tube into the up-current classifier embodied as the bulk material separating apparatus with the removal tube which in plan view is preferably centrally arranged, disruptive filtration dead spaces that would inhibit filtration are substantially not observed. If desired, it is also possible to supply additionally the washing medium into the lifting system and/or into the filter bed contained within the removal chamber. The bulk material separating apparatus is known to a person skilled in the art, whereby after separation of the dirt particles from the bulk material the dirt particles are removed with the liquid to be filtered and conveyed out of the up-current classifier via the socket.

The cleaned bulk material is then allowed to flow, as disclosed above, onto one side of the upper surface of the filter bed, respectively, the surface of the upper side of the filter bed. The term flow discharge is also meant to include sedimentation. Preferably, the stream conveyed by the lifting system also within the up-current classifier includes dirt particles and liquid to be filtered. It is understood that at the area facing the outlet side of the removal chamber instead of the liquid to be filtered filtrate is primarily removed by suction.

BRIEF DESCRIPTION OF THE DRAWING

The drawing shows with drawing simplification, in a schematic greatly enlarged manner without being to scale, an embodiment without limiting the invention.

DESCRIPTION OF PREFERRED EMBODIMENTS

Figure 1:
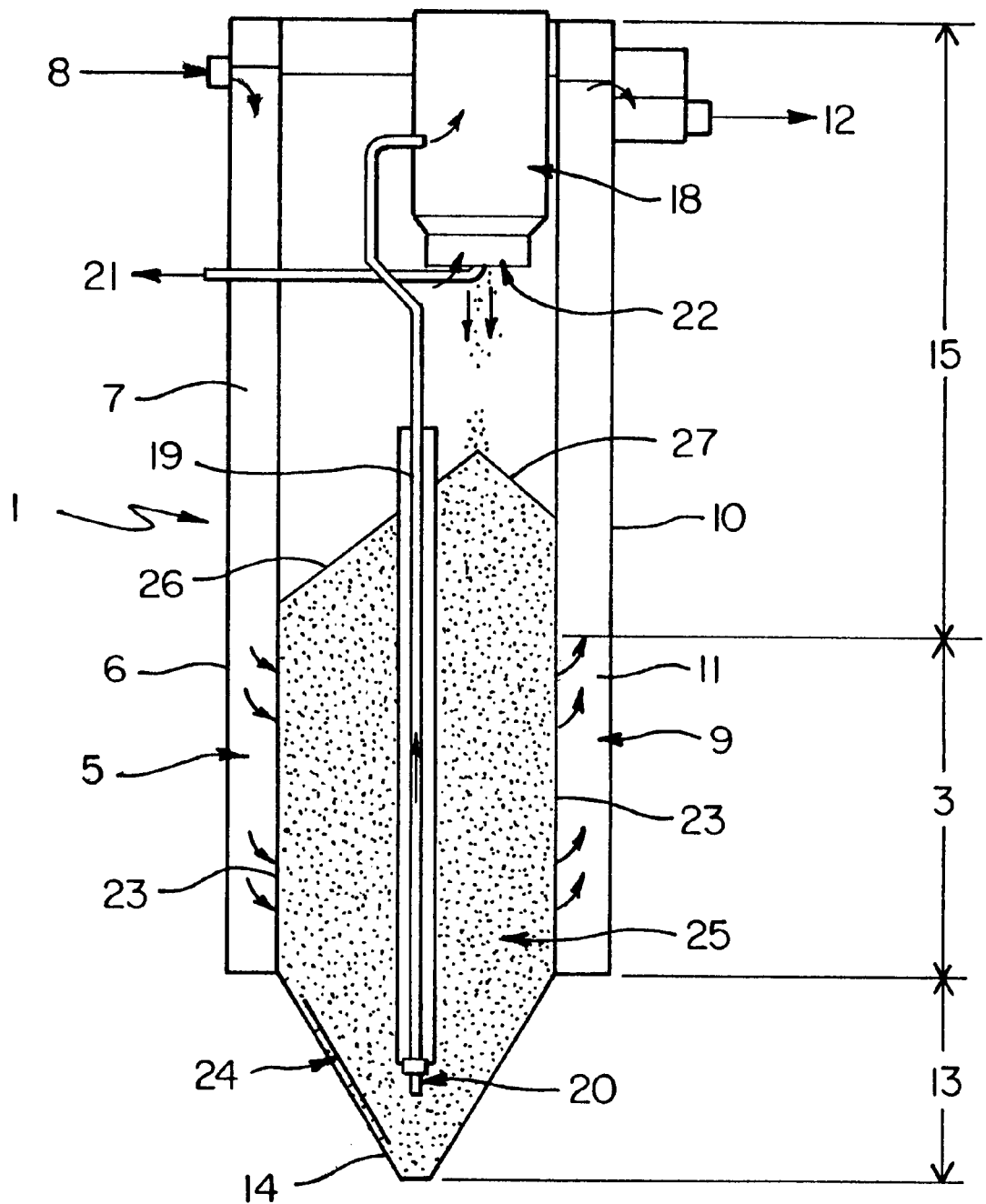
FIG. 1 shows a longitudinal section of the inventive device for continuous filtration.

The inventive device for continuously filtering liquids comprises an upright filtration container 1 which in cross-section is rectangular. The filtration container 1 can be cube-shaped or parallelepipedal. The filtration container 1 comprises inner walls, which in cross-section are also rectangular. One side or one inner wall of the inner walls is an inlet side 5 for the liquid to be filtered and is provided with openings 23. The openings 23, also called penetrations, connect with regard to the liquid the inlet chamber 7 with the filter chamber 3 which in plan view is rectangular. The inlet side 5 of the container 1 is surrounded by an exterior wall 6 which is spaced from the inlet side 5 and forms an inlet chamber 7. The inlet chamber 7 is closed at its upper and lower end. The upper inlet chamber 7 has an inlet opening 8 via which the inlet chamber 7 is connected to an inlet line to allow liquid to enter. The liquid to be filtered flows via the inlet line and the inlet line opening 8 into the inlet chamber 7.

The side opposite the inlet side 5 is an outlet side 9 that is also provided with openings 23 which connect the filtrate collection chamber 11 with the filter chamber 3. The openings 23, also called penetrations, of the outlet side 9 connect the filter chamber 3 with the filtrate chamber 11 to allow passage of the filtrate. The inlet side 5 can be embodied in the shape of louvers or lamella. The outlet side 9 of the filtration container 1 is surrounded by an outer wall 10 or outer mantle which is arranged at a spacing to the outlet side 9 and forms the filtrate collecting chamber 11. The inner wall embodied as the outlet side 9 can be embodied in the form of a bar sieve or filter nozzles. In the shown case the openings 23 extend substantially over the entire height of the filter chamber 3 and over the entire width of the inlet side 5 and over the entire width of the outlet side 9. The filter chamber 3 is the area of the filter bed which serves for filtration of the liquid to be filtered. The size of the extension off the openings 23 of the inlet side 5 matches preferably that of the openings 23 of the outlet side 9 in order to provide for uniform distribution of the liquid to be filtered onto the entire filter surface.

By introducing the liquid to be filtered, in this case industrial waste water with solid particles, the flow of liquid through the filter bed is substantially horizontal and flow across the entire surface area is provided. In order to provide for a constant separation of the bulk material 25 from the solid particles which are contained in the waste water, the bulk material 25 is removed in the removal chamber 13 with the aid of a mammoth pump 20 via the lower suction end. The removal chamber 13 of the container 1 is preferably conically designed and funnel-shaped whereby the funnel wall 14, limiting the removal chamber 13, has injectors 24 for additional introduction of filtrate for loosening the dirt particles from the loaded bulk material and in order to avoid bridge formation. The granular bulk material is conventional filter sand, for example, according to DIN 19623.

The mammoth pump 20 is operated with air whereby the removal of the bulk material is carried out in a pulsating fashion in a preferred embodiment. With respect to the conventional mammoth pump as a lifting system 20, one that is known to a persons skilled is used and reference is made to EP- A 0 291 538. The bulk material that is loaded with solid particles is conveyed via removal tube 19 in the upper direction into the flow discharge chamber 15 of the container 1, that is preferably in plan view rectangular, and is then subjected to separation in the up-current classifier 18 for separation of the solid particles, and the liquid to be filtered that is taken up by suction is removed substantially quantitatively via the outlet line 21 to the exterior, optionally with filtrate and with the solid particles. The removal tube 19 can be centered relative to the central longitudinal axis of the container portion 1 with the flow discharge chamber 15 and the filter chamber 3 and the removal chamber 13. The flow discharge chamber contains the bulk material heap and preferably water as a washing medium.

In one embodiment, instead of the washing water introduced via injectors 24, a portion of the filtrate removed via the drain 12 to the exterior can be injected via the injectors 24 and guided into the removal space 13.

The bulk material distributer comprises a plurality of bulk material flow discharge devices. Each bulk material flow discharge device 22 is embodied as a round outlet. The outlet openings 22 are arranged in a row whereby the row extends parallel to outlet side 9 over the entire width of the outlet side 9. The row is arranged in direct vicinity to the outlet side 9 so that during the flow discharge but to the surface of the upper side of the filter bed a nonuniform bulk material heap with substantially one tip is produced, especially since the outlet openings 22 are arranged very close to one another.

Since many outlet openings 22 are arranged adjacent to one another in a row, the tips that are produced by flow discharge from each outlet opening 22 are combined to one single bulk material heap with one tip, i.e., a bulk material heap crest. The term tip is therefore also to be understood in the context of the invention as a substantially elongate crest of the bulk material heap. This bulk material heap crest or tip extends in a plan view transverse to the flow direction of the liquid to be filtered in the filter bed. The term direct vicinity means also that by sprinkling of the surface of the upper side of the filter bed a non-uniform heap results in which the slanted heap side 26 facing the inlet side 5 is many times longer than the heap side 27 facing the outlet side 9. The term length in this context means the extension of the slanted side from the tip of the heap in the direction towards the inlet side 5 or outlet side 9. In the plan view onto the filter bed the tip or the crest of the heap extends substantially parallel to the outlet side 9, also transverse to the flow direction of the liquid to be filtered in the filter bed. The arrows in the flow discharge chamber 15 and the filter chamber 3 show especially the direction of the bulk material that flows and is to be removed.

In one embodiment of a special kind instead of the plurality of outlet openings 22 an elongate one can be used. Also, instead, one or more distributor plates can be used for controlling generation of one or more bulk material heaps so that the position of the tip of the bulk material heap from the exterior, if required and desired, can be changed, for example, for producing multiple filtration layers within the filter bed (not shown).

Due to the outlet openings 22 arranged parallel to the outlet side 9 in the vicinity of the outlet side 9, the non-uniform bulk material heap is generated. After impinging onto the non-uniform bulk material heap, the sand grains with greater grain diameter move substantially in the direction toward the inlet side 5 while those with smaller diameter remain substantially in the vicinity of the bulk material heap tip. Accordingly, a filter bed is created in which the grain size or grain diameter of the sand in the flow direction of the liquid to be filtered within the filter bed is substantially uniformly decreasing. The flow direction of the liquid to be filtered is transverse to the removal direction of the bulk material.

It has been shown that with the inventive method for cleaning industrial waste water with a high solid particle contents the greatest portion of the solid particles to be filtered, also in the case of flocculation which in the case of conventional sand filters results in clogging of the filter and penetration of the solid particles, will deposit on the larger size sand particles while the finer dirt particles of the industrial waste water are separated by the sand with the smaller grain diameter in a sufficient manner.

Especially by formation of the filter bed with grain size or grain diameter decreasing in the flow direction of the industrial waste water, in comparison to conventional multi-layer methods as well as in comparison to the continuously operating filtration methods according to EP-A 02 91 598, substantially no clogging by flocculation will occur so that no penetration of solid particles or presence thereof at the outlet side 9 will be observed. Accordingly, pressure loss fluctuations in the filter bed which conventionally are observed when clogging occurs cannot be measured. The continuous removal, regeneration and flow discharge onto the filter bed in the aforementioned manner shows that the filtrate exiting at the outlet side 9 has a substantially uniform composition despite extended operating hours of the inventive device. In addition, it is possible that the inventive device, in contrast to EP-A 02 91 538 and the device disclosed therein, substantially no longer requires the upstream arrangement of a pressedimentation stage as a prefiltration of the industrial waste water. Furthermore, the inventive device is characterized also in that its requirements with regard to pumps, blowers, control devices etc. is limited to a minimal number.

Furthermore, in contrast to conventional multi-layer filtration methods, a permanent control of the building of the filtration layers with coarse grains and fine grains of sand is not required because an undesirable mixing is usually not observed. The undesirable mixing of the filter bed of the multi-layer filtration is the result of insufficient back flow of the filter bed.

The advantage of the continuously operating filtration method, such as eliminated operational downtimes, periods and the advantage of conventional multi-layer filtration method, such as the elimination of an external upstream sedimentation stage, are combined with the inventive device and method in a sufficiently successful manner which was unexpected to a person skilled in the art because, based on the minimal apparatus expenditure, the manufacturing cost of the inventive device is minimal and the operating costs due to minimal monitoring and servicing and the high operational safety are low, but also because the inventive device allows filtrations independent of the composition and type of waste water due to the special arrangement of the bulk material in the filter bed so that the requirements in regard to the filtration has been fulfilled in an ideal manner by itself. Accordingly, highly loaded industrial waste waters containing large amounts of solid particles or suspended particles can be filtered as well as water for industrial use, cooling water, circulating water, and swimming pool water can be cleaned without requiring substantially apparatus adaptation of the inventive device. All these advantages underline the ubiquitous applicability of the inventive device.

What is claimed is:

1. A device for continuously filtering liquids, said device comprising:

a filtering container (1) with an upright container portion that in cross-section is substantially rectangular a filter chamber (3) for receiving a granular bulk material (25) forming a filter bed, said filter chamber (3) having in cross-section rectangular inner walls;

said filter chamber (3) having a liquid-permeable inlet side (5) and a liquid-permeable outlet side (9) positioned opposite said inlet side (5), wherein said filter bed is delimited by said inlet side (5) and said outlet side (9);

a liquid-impermeable outer wall (6) positioned at said inlet side (5), wherein said inlet side (5) and said outer wall (6) form an inlet chamber (7);

said inlet side (5) having openings (23) allowing flow of a liquid to be filtered from said inlet chamber (7) into said filter chamber (3), a liquid-impermeable outer mantle (10) positioned at said outlet side (9), wherein said outer mantle (10) and said outlet side (9) form a filtrate collection chamber (11);

said outlet side (9) having openings (23) allowing flow of the filtrate from said filter chamber (3) into said filtrate collection chamber (11), wherein a surface area of said inlet side (5) through which the liquid flows is identical to a surface area of said outlet side (9) through which the liquid flows;

a cone-shaped removal chamber (13) with a funnel wall (14) connected to a lower end of said filtration chamber (3);

a flow discharge chamber (15) connected to an upper end of said filter chamber (3);

a bulk material separating apparatus (18), positioned in said flow discharge chamber (15), for separating dirt particles from the bulk material (25), a lifting system (20) having a removal tube (19);

said removal tube (19) having a lower suction end and an upper end, wherein said upper end communicates with said bulk material separating apparatus (18) and wherein said lower suction end projects into a bottom portion of said removal chamber (13);

a bulk material distributor, comprising one or more bulk material flow discharge devices (22), connected to said bulk material separating apparatus (18), wherein said one or more bulk material flow discharge devices (22) have outlet openings arranged in a row parallel to said outlet side (9);

wherein said one or more bulk material flow discharge devices (22) are arranged at said outlet side (9) above said filter bed;

wherein the bulk material (25) is removed by said removal tube (19) from said removal chamber (13) and guided into said bulk material separating apparatus (18);

wherein the bulk material (25), after separation of the dirt particles by said bulk material separating apparatus (18), is flow discharged by said one or more flow discharge devices (22) onto the upper side of said filter bed, forming at least one bulk material heap that is substantially non-uniform and is arranged at said outlet side (9) such that a side of the bulk material heap facing said inlet side (5) is taller than a side of the bulk material heap facing said outlet side (9).

2. A device according to claim 1, wherein said outlet openings are oval, round, or elongate.

3. A device according to claim 1, wherein said openings (23) of said inlet side (5) are nozzles, louvers, lamellas, bar sieves and/or sieve openings (23) providing a liquid flow communication with said filter chamber (3).

4. A device according to claim 1, wherein said openings (23) of said outlet side (9) are nozzles, louvers, lamellas, bar sieves, and/or sieve openings (23) to allow passage of the filtrate into said filtrate collection chamber (11).

5. A device according to claim 1, wherein said removal chamber (13) has injectors (24) for introduction of solutions and/or washing medium.

6. A method of cleaning liquids selected from the group of industrial waste water, water for industrial use taken from ground water and surface water, circulating water, cooling water, swimming pool water, process liquids, and raw water for producing potable water, by guiding the liquids through a device according to claim 1.

7. A method for continuously filtering liquids, said method comprising the steps of:

a) providing a filter chamber having an inlet side and an outlet side opposite the inlet side, wherein a filter bed comprised of bulk material is positioned in the filter chamber, wherein a conical removal chamber is connected to a lower end of the filter chamber and a flow discharge chamber with a bulk material separating apparatus is connected to the upper end of the filter chamber;

b) introducing a liquid to be filtered through the inlet side into the filter chamber over the entire height of the filter chamber and over the entire width of the inlet side;

c) removing the filtrate through the outlet side over the entire height of the filter chamber and over the entire width of the outlet side, wherein a surface area of the inlet side through which the liquid flows is identical to a surface area of the outlet side through which the liquid flows and wherein the liquid passes through the entire cross-section of the filter bed in the flow direction of the liquid;

d) moving the bulk material of the filter bed in the filter chamber from top to bottom, transverse to the flow direction of the liquid from the inlet side to the outlet side by removing the bulk material from the removal chamber by a lifting device within the filter bed and returning the bulk material to the upper side of the filter bed, after separation of dirt particles from the bulk material by the bulk material separating apparatus, by flow discharge onto the surface of the upper side of the filter bed under formation of least one non-uniform bulk material heap, whereby the bulk material is distributed substantially with increasing grain size in the direction toward the inlet side such that a side of the bulk material heap facing the inlet side is taller than the side of the bulk material heap facing the outlet side.

8. A method according to claim 7, performed at high pressure.

9. A method according to claim 7, performed in vacuum.

* * * * *

UNITED STATES PATENT AND TRADEMARK OFFICE
CERTIFICATE OF CORRECTION

PATENT NO. : 6,143,186  
DATED : November 7, 2000  
INVENTOR(S) : Sabine Van Unen Page 1 of 1

It is certified that error appears in the above-identified patent and that said Letters Patent is hereby corrected as shown below:

<u>Title page,</u>
Please add the following item:
[30], Foreign Application Priority Data
Aug. 12, 1996 [DE] Germany...........196 32 447.5

Signed and Sealed this

Fifth Day of February, 2002

Attest:

Attesting Officer

JAMES E. ROGAN
*Director of the United States Patent and Trademark Office*